United States Patent [19]

Uchida et al.

[11] 4,251,867
[45] Feb. 17, 1981

[54] MONEY EXCHANGER APPARATUS

[75] Inventors: Isamu Uchida; Shinya Uchida; Kyoichi Ohsako, all of Tokyo, Japan

[73] Assignee: Laurel Bank Machine Co., Ltd., Japan

[21] Appl. No.: 21,772

[22] Filed: Mar. 19, 1979

[30] Foreign Application Priority Data

Mar. 25, 1978 [JP] Japan .................................. 53-34399

[51] Int. Cl.³ ............................................. G06F 15/30
[52] U.S. Cl. .................................. 364/408; 235/310; 364/715
[58] Field of Search ............... 364/408, 405, 404, 715; 235/310; 340/147 DD

[56] References Cited

U.S. PATENT DOCUMENTS

| | | | |
|---|---|---|---|
| 3,914,579 | 10/1975 | Shigemori et al. | 364/408 X |
| 3,946,220 | 3/1976 | Brobeck et al. | 364/200 X |
| 4,070,564 | 1/1978 | Tucker | 364/405 |
| 4,092,523 | 5/1978 | Tara et al. | 235/310 |

*Primary Examiner*—David H. Malzahn
*Attorney, Agent, or Firm*—Fleit & Jacobson

[57] ABSTRACT

There is provided a money exchanger apparatus comprising exchange rate input means adapted to enter exchange rates used when exchanging moneys or securities of a single country or plural countries other than a specific country into the currency of the specific country, numerical value information input means adapted to enter numerical information such as the amount and kind of moneys or securities to be exchanged, memory means for storing numerical value information, computing means for calculating the amount and kind of currency of the specific country from the numerical value information indicative of moneys or securities of the country other than the specific country, said information being delivered by the numerical information storing memory means, and from the exchange rate stored in said memory means, and disbursing means for paying out exchange money of the specific country based on the results of computations performed by the computing means.

1 Claim, 4 Drawing Figures

MONEY EXCHANGER APPARATUS

BACKGROUND OF THE INVENTION

The present invention relates to an exchanger apparatus for exchanging foreign monies or securities such as traveller's cheques into domestic currency.

The adoption of the floating exchange rate system has given rise to exchange rates which frequently change. As a result, the exchange of foreign monies for domestic currency requires that conversion be made according to an exchange rate indicated daily, although this troublesome calculation was unnecessary when the fixed exchange rate system was in effect. The money exchange operation has therefore become very complicated. This had led to delays at places where foreign entrants gather, for example, harbors, air ports and hotels. Such individuals are required to wait for a long period of time and are highly inconvenienced.

SUMMARY OF THE INVENTION

It is, therefore, an object of the present invention to provide a novel money exchanger which eliminates the disadvantages described above.

It is another object of the present invention to provide a money exchanger which can easily cope with exchange rate variations and rapidly exchange monies of a plurality of foreign countries into domestic currency.

In accordance with the present invention there is provided a money exchanger apparatus comprising exchange rate input means adapted to enter exchange rates used when exchanging monies or securities of a single country or plural countries other than a specific country into the currency of the specific country, numerical value information input means adapted to enter numerical information such as the amount and kind of monies or securities to be exchanged, memory means for storing numerical value information, computing means for calculating the amount and kind of currency of the specific country from the numerical value information indicative of monies or securities of the country other than the specific country, said information being delivered by the numerical information storing memory means, and from the exchange rate stored in said memory means, and disbursing means for paying out exchange money of the specific country based on the results of computations performed by the computing means.

DESCRIPTION OF THE DRAWINGS

Other objects and advantages of the present invention will become apparent from the following description made with reference to the accompanying drawings, in which.

DESCRIPTION OF THE PREFERRED EMBODIMENT

One embodiment of the present invention will be now described in detail with reference to the accompanying drawings.

Figure 1:
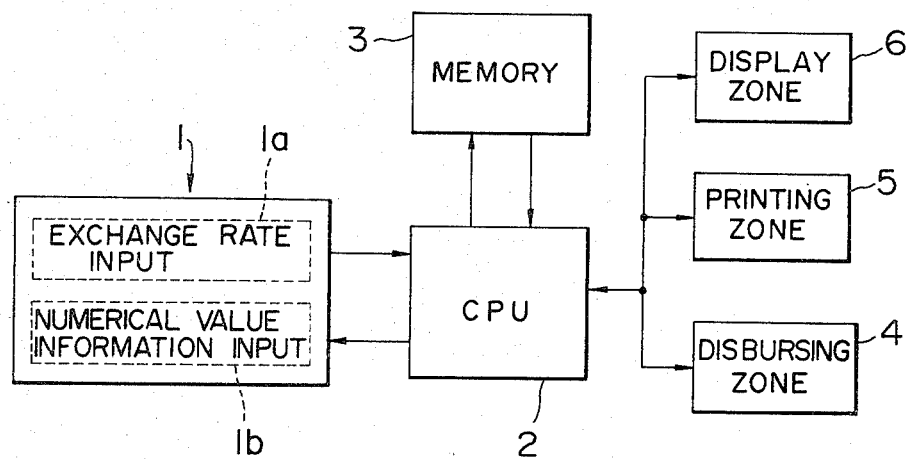
FIG. 1 is a block diagram conceptually illustrating the entire structure of one embodiment according to the invention.

Referring now to FIG. 1 conceptually illustrating the embodiment, the apparatus comprises as the main units an input device 1, a central processing unit (CPU) 2, a memory 3 and a disbursing zone 4 as well as a printing zone 5 and a display zone 6 as auxiliary means. The input device 1 includes an exchange rate input 1a and a numerical value information input 1b. These inputs 1a and 1b comprise keys such as numeric keys, function keys and changeover keys described hereinafter and data reading means for reading the exchange rate or numerical value information. The exchange rate input 1a serves as means for storing in an appropriate location of the memory 3 the exchange rate through the CPU 2 when monies or securities such as traveller's cheques of a single country or plural countries other than a specific country are exchanged for currency of the specific country. As means for entering the exchange rate in the memory 3, there can be adopted a method in which input of the exchange rate is performed by using a key which specifies a country other than the specific country and a numeric key for indicating the exchange rate, a method in which the exchange rate recorded in advance on a magnetic tape, a magnetic card, a punch card or punch tape is read out and then entered, or a method in which an exchange rate designating unit is disposed separately from the exchanger apparatus, with the exchange rate designating unit and exchanger apparatus being adapted to transmit and receive signals so that when a certain exchange rate is designated by the exchange rate designating unit, the designated exchange rate is automatically entered in the exchanger apparatus. A modification is possible in which the exchanger apparatus reads out the exchange rate designated in advance by the exchange rate designating unit according to need. In Japan, an exchange commission is ordinarily included in the exchange rate. If this commission is not included in the designated exchange rate, a modification is possible in which the amount or rate of the commission is entered independently. The input operation for entering the exchange rate or commission can be performed only when a master key is used, with an operator key being used only for routine exchange operations, whereby an operator other than the person in charge is prevented from freely changing the exchange rate, commission and the like.

The numerical value information input 1b serves as means for specifying a country other than the specific country as specified above (namely, for designating the kind of monies or security to be exchanged), the amount of currency to be exchanged and the kind of currency of the specific country to be paid out in exchange. Accordingly, the numerical value information input 1b is provided with the necessary number of numeric keys and function keys, etc.

The CPU comprises a control program for controlling the operations of the input device 1, the memory 3, disbursing zone 4, printing zone 5 and display zone 6, and a computing unit for calculating the amount and kind of money to be paid out from the disbursing zone 4 based on information (exchange rate, commission, designated currency and amount for exchange, etc.) obtained from the input device 1.

The memory 3 serves as means for temporarily storing such information as the exchange rate and commission and the results of calculations performed by the computing unit, for storing information to be fed to the disbursing zone 4, printing zone 5 and display zone 6, and for storing the total amounts of respective currencies and the total amount of disbursed currencies.

The disbursing zone 4 serves as means for disbursing exchange money under the control of CPU 2 upon the input of the result of calculations performed by the computing unit. For example, when the specific country is Japan, four kinds of notes such as 10,000-yen notes and five kinds of coins such as 100-yen coins are used for payment.

The printing zone 5 serves as means for printing the content of information entered in memory 3 to confirm such information as exchange rate, commission and the like when they are entered in the memory 3, or for printing output information from the numerical value information input 1b, the content of the payment made by the disbursing zone 4 (that is, the results of calculation performed by the computing unit) and the date or like information.

The display zone 6 serves as means for displaying information delivered by the input device 1 and the results of calculation performed by the computing unit.

Figure 2:
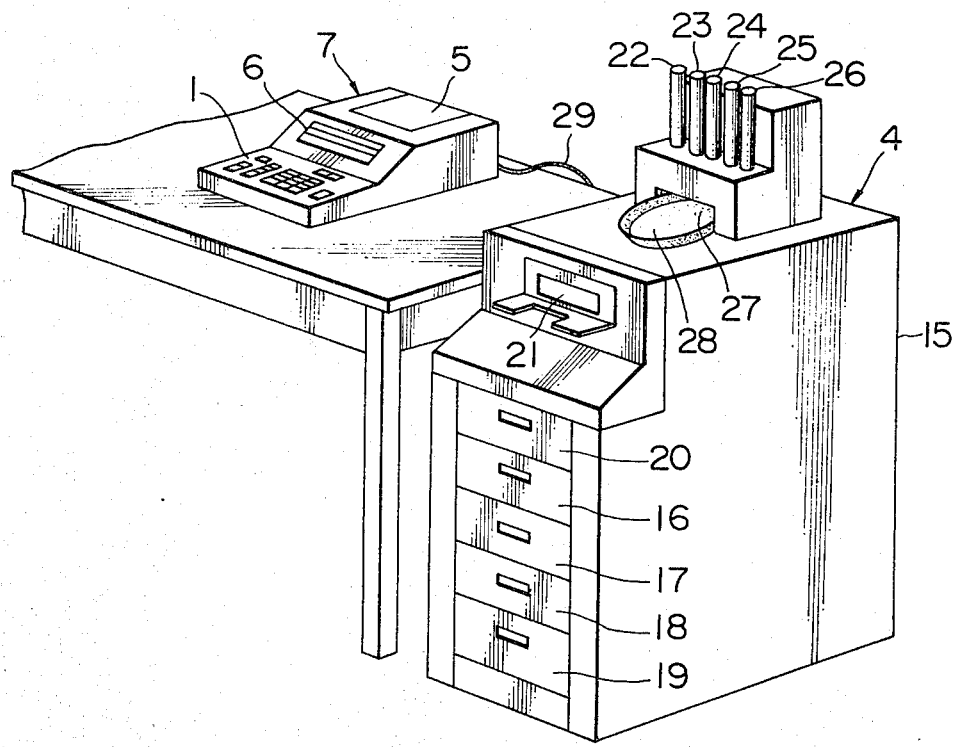
FIG. 2 is a perspective view illustrating a specific example of the apparatus of the embodiment.
Figure 4:
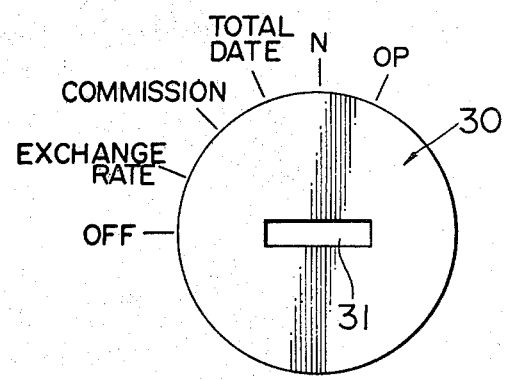

The specific structure of the apparatus of the above-mentioned embodiment will now be described in conjunction with FIGS. 2 and 4.

In the apparatus of the above-mentioned embodiment, the person in charge, once a day, for example, before the start of the exchange business, sets the exchange rate for that particular day in the memory 3 by using the numeric keys, indicating keys and changeover switches of the input device 1. After the start of the exchange business, an operator enters into the exchanger information on the amount and kind of currency received from a customer, the currency being of a country other than the specific country (Japan in this case). The operator uses the numeric keys, indicating keys amd changeover switches to pay out the exchange currency (yen in this embodiment) from the disbursing zone 4. This has the capacity to record the results of exchange business conducted for one day (kinds and amounts of received foreign monies, kinds and amounts of exchange monies and the grand total of received monies).

Figure 3:
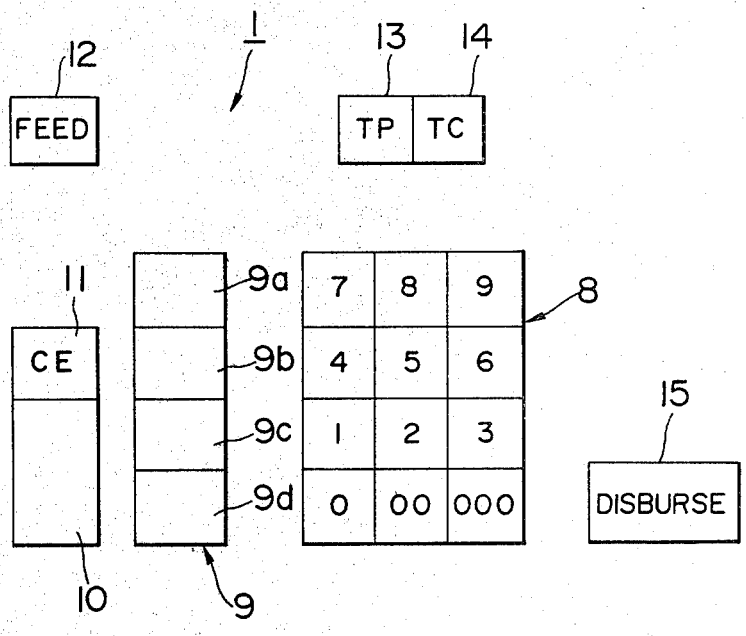
FIGS. 3 and 4 are plan views showing the input device of the apparatus of the embodiment.

The input device 1, printing zone 5 and display zone 6 are integrally arranged on an operation desk 7 as shown in the drawing, and CPU 2 and memory 3 are disposed in the interior of the operation desk 7. The input device 1 includes numeric keys 8, indicating keys 9, a clear key 10, clear entry key 11, paper feed key 12, TP key 13, TC key 14 and disbursing key 15 (see FIG. 3) and changeover switch 30 (see FIG. 4). The numeric keys 8 are used when the person in charge enters the data of the exchange rate, commission and date after setting the changeover switch 30 at the positions of "exchange rate", "commission" and "date" by the master key (not shown) and when the operator sets the changeover switch 30 at the position "OP" by using the operator key (not shown) to enter the amount of foreign currency. The indicating keys 9 are used for indicating currencies of countries other than the specific country (Japan in the present embodiment). For example, dollar, mark, pound and franc currencies are indicated by key 9a, 9b, 9c and 9d, respectively. These indicating keys 9 are also used for setting commissions for respective foreign currencies. The clear key 10 is used to correct erroneous operation of the numeric key 8, and the clear entry key 11 is used to change an input of the kind of amount of foreign currency by using the indicating key 9 and the numeric keys 8. The paper feed key 12 is used to feed out paper contained at the printing zone 5. TP key 13 is used to read the contents of actually performed exchange operations from the memory 3 and to print them on printing paper at the printing zone 5. TC key 14 is operated after the changeover switch 30 has been set at the position "TOTAL" by using the above-mentioned master key, and it is used to print the contents of an entire day's exchange operations on printing paper and erasing said contents stored in the memory. The disbursing key 15 is operated after the changeover switch 30 has been set at the position "OP" and the kind and amount of foreign currency have been entered by using the indicating keys 9 and numeric keys 8, and it is used to pay out exchange money from the disbursing zone 4.

The changeover switch 30 is mounted on the side portion of the body of the operation desk 7. When the master key or operator key is inserted in a key hole 31 and then turned, the changeover switch 30 can be set at any of the above-mentioned changeover positions. When the exchanger apparatus is not operated, the switch 30 is set at the position "OFF" to cut the connection to a power source. After the person in charge has entered data on the exchange rate and the like in the input device 1, the switch 30 is set at the position "N". Next, at the start of business, the operator changes the setting position of the switch 30 from the position "N" to the position "OP" by means of the operator key. Thus, the exchange operation can be started at any time by using the input device 1.

In order to prevent the operator from freely changing the exchange rate and commission set by the person in charge, the switch is arranged so that the operator key is capable of rotation only in the clockwise direction from the position "N" to the position "OP" but is incapable of rotation in the counterclockwise direction from the position "N" to the position "exchange rate" or "commission".

The disbursing zone 4 connected to the operation desk 7 through a cord 29 comprises, as shown in the drawing, a body 15 on which there are disposed note-containing cases 16 to 19 for four kinds of notes (10,000-yen, 5,000-yen, 1,000-yen and 500-yen notes), a reject note-containing case 20 for receiving reject notes discharged when notes are unsatisfactory or counting is erroneous, a note discharge opening 21, coin storing cylinders 22 to 26 for five kinds of coins (100-yen, 50-yen, 10-yen, 5-yen and 1-yen coins), a coin discharge opening 27 and a receiving tray 28 for receiving discharged coins. Further, a note-counting device, a note delivery device, a coin counting device and similar devices are disposed in the interior of the body 15. The disbursing zone 4 is designed so that the kinds of notes and coins to be discharged are calculated so as to minimize the total number of the notes and coins.

The display zone 6 includes a numeric display portion of a plurality of digits for displaying the operations contents of the numeric keys 8 (exchange rate, amount of foreign currency, date, commission, etc.) and an indication display portion for displaying indication contents according to four indicating keys 9a to 9d.

The operation and operating procedure of the apparatus of the above-mentioned embodiment will now be described.

Before the start of the exchange business for one day, the person in charge changes the position of the changeover switch 30 from the position "OFF" to the position "exchange rate" by using the master key. At this point, the exchanger apparatus is connected to a power source to place the exchanger apparatus in a state where input of the exchange rate is possible. Then rates of exchange of four kinds of foreign currencies, that is, dollar, mark, pound and franc currencies to be exchanged for currency of the specific country (Japan), and which have been set for this day, are entered in the input device 1 by operating the numeric keys 8 and indicating keys 9 alternately, for example, the indicating key 9a and numeric key 8, indicating key 9b and numeric key 8 . . . , these inputs being stored in the memory 3. Then, the position of the switch 30 is changed to the position "date" and thereafter the date is entered in the input device 1 by operating numeric keys 8 to store the data in the memory 3. The position of the switch 30 is then changed to position "N", and the master key is withdrawn. This places the exchanger apparatus in a state where an operator can perform exchange operations for this day. The operator changes the position of the switch from the position "N" to the position "OP" by using the operator key. For example, when a customer wishes to exchange 100 dollars for yen currency, the indicating key 9a is depressed to designate dollar currency and the numeric keys 8 for "1", "0", and "0" are depressed and this is followed by the depression of the disbursing key 15. Information indicative of the amount of 100 dollars is entered in the computing unit of CPU 2 and the dollar-yen exchange rate stored in the memory 3 is read out and entered in the computing unit to effect calculation. Data indicative of the kinds and numbers of notes and coins corresponding to the calculated amount of yen currency are sent to the disbursing zone 4 when the key 15 is operated. The disbursing zone 4 counts the numbers of notes and coins on the basis of these data and performs the disbursing operation of discharging notes and coins into the discharge opening 21 and tray 28. The operator receives the discharged money and hands it to the customer, whereby one exchange operation cycle is completed. Exchange of other foreign currencies for yen currency is performed in the same manner as described above.

When it is desired to know the details of the exchange business during the business day, the TP key 13 is depressed to print the details of the exchange operations performed on printing paper. After the exchange business for one day has been completed, the person in charge changes the position of the changeover switch 30 from the position "N" to the position "TOTAL" by using the master key. When the TC key 14 is then depressed, the details of exchange business for this day are printed on printing paper while the data (contents of exchange business for this day) are erased from the memory 3 to prepare for the next day's exchange business.

In the foregoing embodiment, currency of one country is treated as currency of the specific country. The exchange apparatus of the present invention may be modified to allow the exchange of currencies of a plurality of countries for currencies of a plurality of specific countries. Further, the input device and other members may be arranged so that the kinds and amounts of exchange notes and coins paid out from the disbursing zone can be freely specified. Furthermore, the exchanger apparatus can be designed so that a customer can himself perform the operations of introducing foreign moneys or securities into the apparatus, indicating the desired amounts and kinds of notes and coins of a desired specific country by using the keys and receiving discharged notes and coins without the aid of an operator. In this case, a discriminating mechanism must be attached to the exchanger apparatus so as to detect counterfeit monies and securities, although this discrimination is performed by the operator in the described embodiment. Furthermore, there may be adopted a modification in which the portion including the CPU and memory is separated from the input device, disbursing zone, printing zone and display zone with only one processing device including the CPU and memory being provided while a desired number of terminal devices, each including an input device, a disbursing zone, a printing zone and a display zone, are installed, one processing device being used in common for a plurality of terminal devices.

As will be apparent from the foregoing illustration, according to the present invention, there is provided an exchanger apparatus in which the amounts and kinds of moneys of a plurality of countries other than one specific country or a plurality of specific countries are entered. The amounts and kinds of exchange monies are then calculated according to exchange rates set in advance by exchange rate input means and exchange monies are automatically paid out. Employing the exchanger apparatus of the present invention therefore greatly facilitates the exchange of currencies of a plurality of countries. Further, the exchange apparatus can promptly cope with any change in the exchange rate. Thus, various advantages can be attained according to the present invention.

What is claimed is:

1. A money exchange apparatus, comprising:
   input means for entering exchange rates used when exchanging monies or securities of a single country or plural countries other than a specific country into the currency of the specific country, and for entering numerical value information such as the amount and kind of monies or securities to be exchanged;
   memory means connected to said input means for receiving therefrom and for storing said exchange rates and said numerical value information;
   computing means connected to said memory means for calculating the amount and kind of currency of the specific country from the numerical value information indicative of monies or securities of the country other than the specific country, said information being delivered by the memory means, and said computing means calculating said amount and kind of currency of the specific country also from the exchange rate stored in said memory means; and
   disbursing means connected to said computing means for paying out exchange money of the specific country based on the results of computations performed by the computing means;
   said apparatus further comprising changeover switch means having a first position for enabling input of said exchange rates via said input means, and a second position for input of said numerical value information via said input means, and wherein said changeover switch means is constructed so as to be movable to said first position only by use of a master key, whereby alteration of the exchange rates is precluded except by use of said master key.

* * * * *